Nov. 11, 1969     P. O. LOUDON     3,477,407
FISH FEEDING DEVICE
Filed July 10, 1967

Percy O. Loudon
INVENTOR
BY
Atty.

3,477,407
Patented Nov. 11, 1969

3,477,407
FISH FEEDING DEVICE
Percy O. Loudon, 10113 Highway 99,
Vancouver, Wash. 98665
Filed July 10, 1967, Ser. No. 652,321
Int. Cl. A01k *61/00*
U.S. Cl. 119—51                    8 Claims

ABSTRACT OF THE DISCLOSURE

This development is directed to apparatus and to an opertaing method by which comminuted fish food intermixed with air and jointly intermixed therein, may be distributed over a pond by a directed blast of air that is directable so as to place food uniformly and evenly over the entire surface of the pond, or other body of water.

My invention relates to a fish feeding device which may be used with outdoor rearing ponds as opposed to covered structures.

To this extent, this invention is an improvement on my invention in U.S. Patent No. 3,029,790, that issued April 17, 1962, and is entitled Periodic Fish Feeder.

Within a building, food being strewed over the surface of a runway or pond is not subject to swirling overhead air current such as are present outside on a windy day. Thus, finely divided food, when feeding under cover, may be projected from an altitude substantially above the surface of the pond. Outdoors, this is impractical and wasteful, ir not impossible, because much of the food stuff would be carried by the wind currents beyond the lateral areas of the feeding pond or runway. Also, when fish are fed indoors, overhead distributing heads may be arranged centrally of a pond or tray. Outdoors, this is an impractical arrangement for the reason that if the overhead dispersing trays lay closely adjacent the surface, it will serve only a limited area. Also, the provisions of elongated dispersing screens involve substantial expense and are difficult to move from one location to the other.

I have also discovered, particularly on outdoor runways, that food must be supplied at more frequent intervals and with greater uniformity. Dispersal of small quantities should be discharged uniformly over the surface of the entire runway so as to provide equal access to all of the fish being reared therein.

Another factor involved variance in water temperature. Under cover, the water in the rearing pond may be controlled within closer limits than is practical outdoors. Small fingerling fish are voracious eaters, but when the water temperature is below 45° F. they will ingest only small particles of food at a time and thus they will seek out only small particles that rest upon the water surface without becoming wetted and will be available when the fish are eating. Indoors, feeding of fish at 15 minute intervals suffice. Outdoors, it has been my experience that fish should be fed almost constantly during their feeding hours or at least that the food be presented to them in uniform particle size and be uniformly dispersed.

All of the foregoing criteria may be observed efficiently and effectively with an outdoor feeder embodying my invention, in which.

Figure 1:
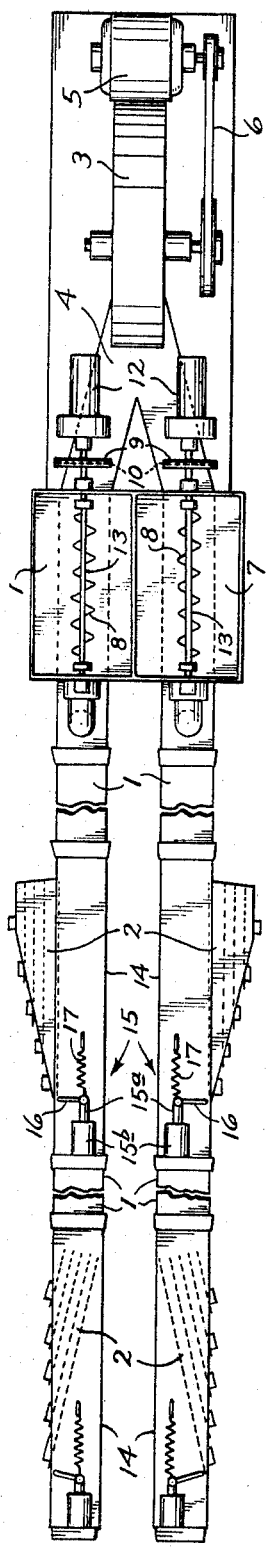
FIG. 1 is a plan view of a feeder providing multiple stations and selectively operable to discharge a light dusting of finely divided particles of food over the entire surface of a runway.

For many years I have interested myself in the feeding, propagating and rearing of fish under controlled conditions, as in a hatchery. I have thus learned from personal association in this industry much about the eating, feeding and growth habits of fish. Although they are generally the same with different species, they vary with each species. Most of my original work was done with rainbow trout, as a commercial grower. In said work, I am familiar with the practices and experiences of other commercial growers, but also I am familiar with those of State, Federal and foreign agencies with regard to feeding fish from their eyed state to commercial size. Much of said information has been disclosed in my issued patent, No. 3,029,790, previously referred to, that issued April 17, 1962, and entitled Periodic Fish Feeder.

Rainbow trout are native to streams in certain areas such as in the Pacific Northwest. These fish are surface feeders and will eat only that portion of distributed food that rests upon the surface of the water, due to the surface tension existing at the water surface. Since such time, my interest has been directed to the feeding of salmon fingerlings and even smaller size fish. I have tried to simulate natural feeding conditions and my work has attained more than local recognition. One common hypothesis throughout all fish feeding is that food must be avaiable uniformly for all of the fish in the continuous body of water. This permits all to have equal access to food and not merely the strong and swift ones. Because the instinct of self-preservation is strong in wild life, it is necessary that no strange appearing mechanism appear over the surface of the body of water. I have discovered that food may be distributed less visibly in a more finely divided state and with a more uniform pattern if it is air borne with the discharge air jets spaced laterally and longitudinally so that the food coverage is more or less continuous and uniform, in its disposition.

I have heretofore commented upon the fact that fish of subfingerling size, although they are voracious eaters, they can eat only one small particle at a time. This will be swiftly ingested and a few moments later the little fish will want to feed further, and it has to be available or else the fish will not enjoy as rapid growth as where such foodstuff is available when they want to eat. I have known of situations where 60% of a batch of fish will die from starvation, rather than from other causes. These small subfingerling fish, if reared in an artificial environment, as in a hatchery, are conscious of every movement and quickly associated movement with the spreading of food. In natural conditions, such movements might warn them of danger and would cause they not to eat. The constant presence of food when the fish wants and need it, determines the size and rate of growth of fish over a given period of time. In a pond or runway approximately four feed wide and sixty feet long, three ounces of comminuted food must be deposited upon the surface of the pond at least every five minutes, and this must be done without disturbing movements or sounds.

It is desirable that mechanism for feeding fish should be designed to utilize dry foodstuffs as for example with trout, silverside or coho salmon, sea-run rainbows which are termed "steelheads." Chinook salmon, which is the chief commercial fish in the Pacific Northwest, must be fed soft foodstuff. Usually commercial hatcheries feed an intermixture of pulverized ground fish and a starchy carrier which absorbs the oily ground fishmeal. In order to keep this moist oily foodstuff from deteriorating, it must be kept frozen. Homogenized pellets of foodstuff are about the size of pellets in shotgun shells. As material melts, it softens and becomes very sticky and adherent. To adapt a feeder embodying my invention, I use plural tubes discharging longitudinally of a runway, but also inclined laterally thereof to lay a pattern over the entire water surface with uniform dispersion. Plural tubes of varying lengths, but more or less uniform angular interception, form discharge apertures with relation to a given limited area. While air blasts carry the foodstuff, and particularly those that tend to be adherent, develop relatively high velocity, they must disperse measured quantities of food. Each jetting orifice comprising multiple obliquely disposed tubes tend to produce uniform high velocity and thus uniform movement of food through the conduits and jetting orifices therefrom. For example, say a feeding conduit with four jetting orifices be paired two and two, the food is discharged say three-quarters of an ounce from each tube to ensure wide and uniform dispersal of food for the reasons commented upon.

Figure 2:
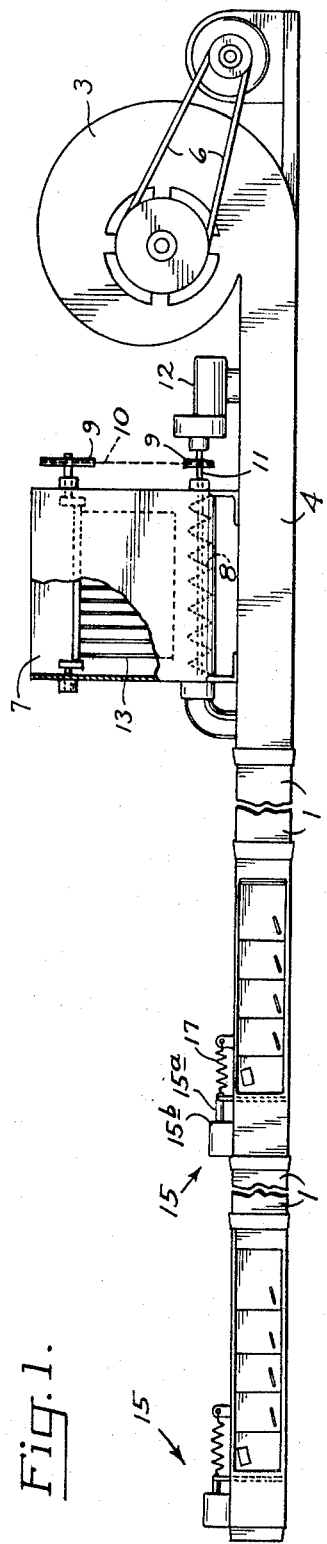
FIG. 2 is an elevation of a machine embodying my invention with a portion of the casing shown broken away to disclose details of construction.
Figure 3:
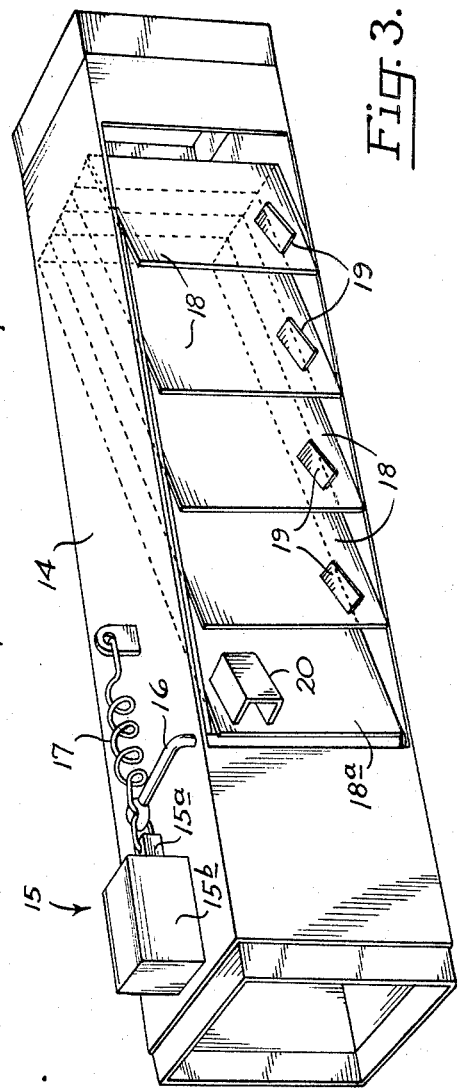
FIG. 3 is a perspective view of a distributing head for dividing in a fan-shaped pattern, foodstuff generally blown longitudinally of a runway but laterally inclined towards one or other of the sides of the runways, which are usually elongated.

Mechanism embodying my invention comprises elongated blowing conduits 1 having discharge jetting apertures 2 communicating therewith at modular spacing. The longitudinal modules are dictated by the quantity of food being distributed over a race or runway and the span by the velocity of air being forced through the bores of said conduits. I preferably provide a single blower 3 to serve two conduits, as is shown in FIGS. 2 and 3. This conduit has a horizontal intake 3a communicating with a tangental discharge outlet 3b at each side thereof. A bifurcated joining section 4 joins the discharge outlets of the blower with each of paired blowing conduits 1. A motor, illustrated as an electric motor 5, drives the rotor of the blower by means of an endless belt 6. Downstream from the bifurcated section is a food feeding mechanism comprising downwardly converging funnels 7 to an auger feed 8 at the lower portion of each of the downwardly converging funnel portions. The augers are driven by sprockets 9 respectively joined by endless chains 10 operatively driven by shaft 11 of feed motor 12. Quantities of food in highly comminuted form fill the downwardly converging funnel-shaped funnels 7 and agitators 13 oscillate and form beaters, driven by the uppermost sprocket 9, as is shown in FIG. 2. The flow of food by the augers is from right to left, as shown in FIG. 2, and each funnel 7 discharges into its underlying blowing conduit 1. The augers are preferably provided with timers (not shown) which causes food to be discharged periodically into the blowing conduits.

It is usual that the blower 3 operates continuously during feeding time, usually morning and evening, and the timers for the food mechanism are actuated to interrupt the food supply so as to provide predetermined quantities to be discharged over the surface of the rearing pond per interval of time. Distributing heads 14 are pivoted at their left hand margin, as is shown in FIG. 1, so that they may be rotated by their respective air motors 15, either to lie parallel to the peripheral surface of a blowing conduit so that no air is discharged therethrough or to lie obliquely disposed, as is shown in the left hand pair of distributing heads shown in FIG. 1, while the upstream head intercepts all of the air flowing through its blowing conduit.

An obliquely disposed distributor head is shown in enlarged scale, and in perspective, in FIG. 3. Each distributor head has four vanes spaced apart and maintained in parallelism with each other, when crank arm 16 is rotated clockwise, as shown in the uppermost conduit 1 in FIG. 1. This will produce the position of the distributor head parts as is illustrated in FIG. 3 and in the left hand agitator head in FIG. 1. When the crank arm is rotated counterclockwise, it lifts the distributor head into parallelism with the conduit, as is shown in the right hand distributor head in FIG. 1. The separating plunger 15a for the air motor is pulled into the cylinder 15b by fluid and is opposed by a spring bias 17 for each distributing head, as is illustrated.

The power for the motors 15 can be pneumatic, electro-magnetic or hydraulic. The agitators are spaced longitudinally and this spacing is shown by the foreshortened sections upstream from each related pair and downstream thereof, as illustrated in both FIGS. 1 and 2. Usually, it is not necessary to make these predetermined spacings adjustable. They are usually selected to an optimum open passageway and remain so set until they are moved to another feeding location.

Upon each vane or separator 18 is a downwardly inclined baffle 19 that tends to direct the air and the finely divided food carried thereby downwardly towards the surface of the body of water being fed so as to prevent wastage of food by distributing cross currents of air.

Upon the innermost vane 18a of each distributing head is arranged an open box-like baffle arranged at the upper edge thereof and preferably downwardly inclined, at the same angle as that of the baffles 19. Said baffles 19 are preferably arranged near the bottom of each of the vanes 18 because the comminuted food is heavier than air and tends to fall toward the bottom of each vane at the point of discharge due to loss of velocity. Upon the rearmost vane 18a the open box-like baffle is arranged adjacent the upper edge to deflect food particles that have passed over the other baffles so as to prevent them from being directed upwardly and out of the runway which is being fed.

I have made no effort to show the circuitry or conduits for the several motors, or the particular form of make-and-breaks, valves and the like, because these would be self-suggestive to a person skilled in the art and the details thereof would only complicate this disclosure.

Also, no effort is made to show the form of the pool or runway served by my automatic dispenser of fish food products. It is to be understood that supports are provided over said runway and the conduits are more or less parallel with the longitudinal dimension thereof. For example, if the runway were eight feet wide, the conduits would straddle the longitudinal center line and be spaced apart approximately a foot or so. The selected angle of angularity of the vanes of the distributing heads are determined with relation to the velocity of the air blast so the ultimate lateral spread of discharge air-food-intermixture would spread sufficiently to cover the surface of the water to the lateral margins thereof.

The blower and its motor, together with the food reservoirs, usually lie at one end of the runway or pound and do not overlie it. The conduits do not extend the full length of the runway or pond, but stop short of the said end a distance equal to the effective length of the plume of food particles projected lengthwise of said pool or runway by my apparatus. If the banks or sides of the pool or runway are not vertical, it is not desirable that the food be distributed to the extreme width or the extreme length thereof, to avoid wastage of food. The number of pairs of distributor heads is also selected to correspond to the length of the pond or runway.

If it is desired to feed the distant end of a body of water, only the most distant distributor head is inclined laterally and the other distributor heads are maintained parallel to the peripheral sides of the conduit, as is shown in pair of distributor heads to the right of those that are obliquely disposed in FIG. 1. Thus, to inactivate the distributor heads selectively, separate controls are provided for holding said distributor heads out of intercepting position. This permits the entire air blast to be directed to those distributor heads that are moved into intercepting position.

The use of a single throw motor 15 with spring bias for the return to non-intercepting position is illustrated because this is the simplest form of motor control. If a solenoid is used, it will be thus a single throw type which, when energized, will pull the distributor heads into intercepting position and when current is broken, the spring bias members 17 will bring the distributor head into parallelism, which is in non-intercepting position with respect to the conduit upon which it is pivotally mounted. The bores of the conduits are straight and plane with no interruptions so that the blast of air will always keep them free of accumulation of food particles. That is to say, the conduits are of substantially uniform cross section to avoid shoulders or interruptions. The heads of the conduits are preferably made with bell-and-spigot ends, as is illustrated in FIG. 3, so as to maintain smooth interior bore surface.

For similar purposes, the vanes are plane, except for the baffles and the latter are sloped uniformly downwardly with regard to the air flow so as to inhibit collection of food particles thereby and thereon.

I have deemed it to be more satisfactory to have the distributing heads either fully open or fully closed so that when they are open in intercepting position, the air blast sweeps them clean. Also, when they are closed, that is when they lie parallel with the sides of the conduit, their surfaces form a continuation with the sides of the conduits so that they will also be maintained clean.

Although I have referred to the crank arm 16 rotating about a vertical axis, I do not wish it to mean exactly perpendicular to the surface of the body of water but designate this position to define its general aspect.

The rotatable augers at the funnel sides of the food reservoirs, provide a positive displacement control of food being discharged into the air stream. That is to say, when the auger does not rotate, no food is discharged. The agitators 13 being supported by crank arms oscillate all of the time that the augers are rotating to prevent "arching over" in the reservoirs. "Arching over" might be due to the viscosity and adhesive quantities of wet food particles and with dry foodstuff matter due to the downwardly converging sidewalls of the funnel, if it were not for the agitators. This provides an assurance that food particles will be separated immediately before they are released to the augers and thus they are in a fluffy nonadhering condition.

As has been pointed out, this feeder is adapted to be usd to provide food for all species of game fish from fish that have just passed their eyed state to those that are ready for release as catchable fish in a stream. That is to say, this feeder may be used with foodstuff particles that are as small as flour size particles to food comparable to food particles as large as one-eighth inch in diameter, appropriate to feed fish of releasable size, both with respect to trout and to salmon.

I claim:

1. In the art of feeding fish in an elongated rearing pond,
   the method of dispersing comminuted food uniformity over the entire effective surface of said pond while said comminuted food is intermixed in air, comprising
   directing a conducted blast of air-food intermixture over the longitudinal dimension of said pond through plural laterally spaced aligned mated pairs of outlets,
   said mated pairs of outlets being spaced apart modular distances over said pond, and
   selectively opening and closing said outlets to vary the coverage of said pond with food particles, whereby food is air blown and dropped lightly in dispersed condition upon such surface and within its lateral and longitudinal bounds.

2. An automatic and adjustable dispenser of fish food particles, comprising
   a pair of elongated conduits each having a bore of substantially uniform continuous cross section and lying side by side,
   an air blower discharging into one end of each conduit,
   a reservoir of comminuted food particles discharging into each conduit downstream from said blower,
   distributor heads pivotally mounted with said conduits, whereby the same are selectively movable from nonintercepting position to intercepting position with respect to said conduits, respectively.

3. The subject matter of claim 2 modified in that each of said distributor heads comprise plural spaced parallel plane vanes pivotally joined to its conduit and having an operative range from a position where the distributor head lies wholely outside its conduit to a position where it intercepts the bore thereof and lies obliquely across said bore.

4. The subject matter of claim 2 modified in that each of said distributor heads comprise plural spaced parallel plane vanes pivotally joined to its conduit and having an operative range from a position where the distributor head lies wholely outside its conduit to a position where it intercepts the bore thereof and lies obliquely across said bore, each distributor head being pivoted upon a vertically disposed axis and having vertically inclined baffles carried by certain of said vanes to produce lateral deflection of the air-borne food particles, said vanes lying adjacent the discharge end of the associated vane to which such end baffle is carried.

5. The subject matter of claim 2 modified in that said distributor heads are arranged in mated pairs.

6. The subject matter of claim 2 modified in that said distributor heads are arranged in mated pairs and the pairs are plural in number, being longitudinally spaced along their associated conduit upon modular distances.

7. The subject matter of claim 2 modified in that each reservoir has a positive displacement, food discharge means and an agitator overlying such food discharge means.

8. The subject matter of claim 2 modified in that each reservoir has a positive displacement food discharge means and an agitator overlying such food discharge means, said food discharge means and its agitator being power-actuated by a common motor.

References Cited

UNITED STATES PATENTS

| | | | |
|---|---|---|---|
| 672,409 | 4/1901 | Scheidegger | 198—6 X |
| 958,970 | 5/1910 | Nev | 302—61 |

HUGH R. CHAMBLEE, Primary Examiner

U.S. Cl. X.R.

119—51.11